Figures 1, 2:
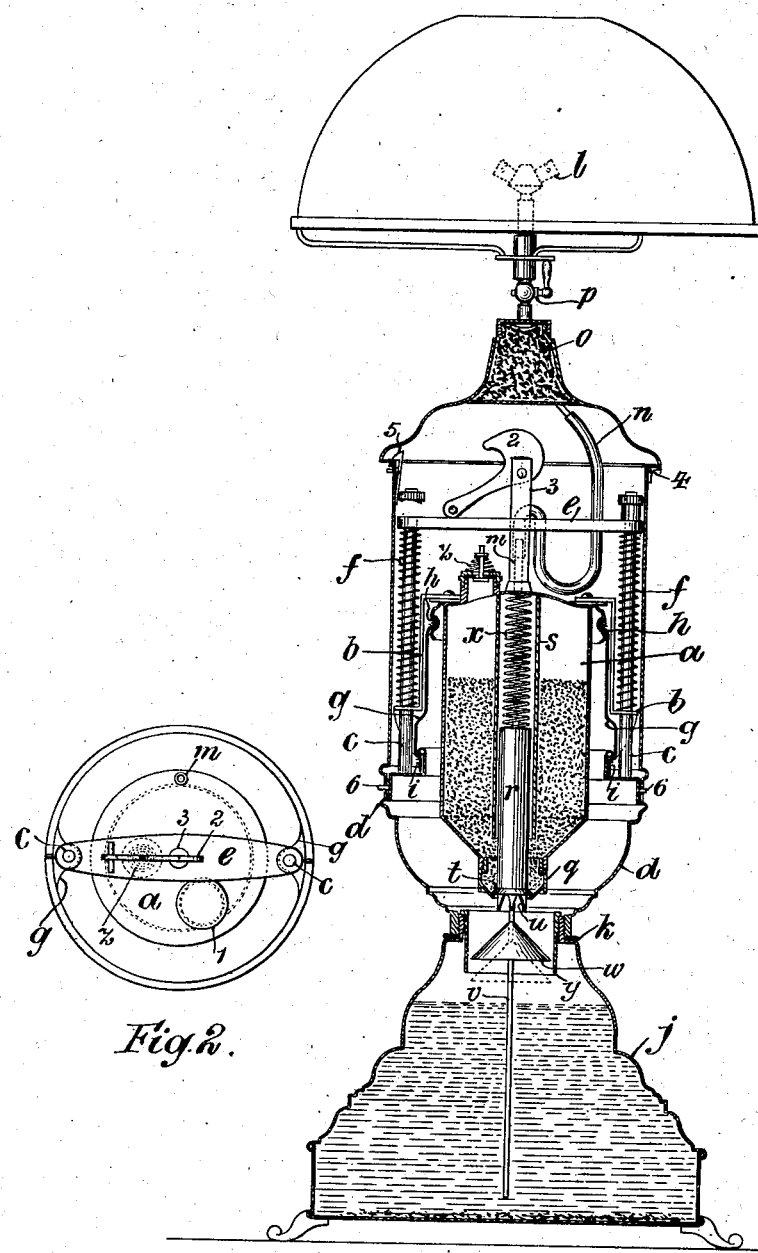

No. 730,221. PATENTED JUNE 9, 1903.
H. BAUMGARTEN.
ACETYLENE GAS GENERATOR.
APPLICATION FILED AUG. 21, 1902.
NO MODEL.

Witnesses:
E. B. Bolton
L. J. Boaz

Inventor:
Henry Baumgarten
By Richards & Co.
his Attorneys.

No. 730,221.  
Patented June 9, 1903.

UNITED STATES PATENT OFFICE.

HENRY BAUMGARTEN, OF LONDON, ENGLAND.

ACETYLENE-GAS GENERATOR.

SPECIFICATION forming part of Letters Patent No. 730,221, dated June 9, 1903.

Application filed August 21, 1902. Serial No. 120,557. (No model.)

*To all whom it may concern:*

Be it known that I, HENRY BAUMGARTEN, of No. 222 Shaftesbury avenue, London, England, have invented a certain new and useful Improved Automatic Generator and Lamp for Acetylene Gas; and I do hereby declare the following to be a full, clear, and exact description of the invention, such as will enable others skilled in the art to which it appertains to make and use the same.

This invention relates to a self-contained contrivance which is adapted to effect the generation of acetylene gas from calcium carbid in small quantities at intervals which are automatically regulated by the approaching exhaustion of the previous supply of gas.

The apparatus is adapted to serve the purpose of a lamp in any isolated position, and on account of its portable character it is especially suitable for lighting vehicles, ships, and other means of transport.

The principal feature of the invention consists in the provision of a gas-bag which is more or less cylindrical in shape, one edge of which is secured in gas-tight connection with the case of the generator and the other edge with a vessel which serves as the carbid-receptacle, which rises when the gas is being generated and sinks during the escape of the gas through the lamp-burner. The bag is formed of impervious flexible material and may advantageously be made of rubber, so as to be also expansible. The rising and falling of the carbid-receptacle will effect an alternate expansion and contraction of a chamber which forms a temporary reservoir for the gas which is generated. When the material of the bag is elastic, the expansion and contraction of its diameter will also serve to effect the required change of volume of reservoir. The carbid-receptacle is guided in its up-and-down movement by lugs threaded on fixed guide-rods and is pressed downward by a spring or by springs which encircle the guide-rods. In the bottom of the carbid-receptacle a valve is provided which opens upward when the receptacle has descended to nearly its lowest position and permits a small quantity of carbid to escape and drop into a vessel of water which is provided in the base of the generator. The vessel of water has a neck and screwed mouthpiece whereby with a soft washer a gas-tight connection is made with the casing of the generator. When used as a table-lamp, the water vessel is made ornamental and spreading at the bottom, and so forms a base or stand for sustaining the lamp.

The invention includes also the provision of a safety-valve to avoid an undue pressure of gas, a cam device to relieve the pressure of the gas when the apparatus is out of use, a removable cap for recharging the carbid-receptacle, a cover which carries the gas-burner and lamp-shade, and also a chamber containing a filtering and purifying material, which cover is hinged to the casing of the generator, the filtering-chamber being connected with the gas-holder by a flexible pipe, and the invention further includes a device which prevents the splashing of the water into the upper portion of the generator.

The operation of this contrivance takes place as follows: On the escape of the gas through the burner the carbid-receptacle $a$ will descend, being pressed downward by the springs $f\,f$. The valve will accompany the receptacle and keep the orifice closed until the end of the rod $v$ comes in contact with the bottom of the water vessel $j$, after which the valve being unable to descend any farther the orifices between the feathers $u$ will commence to open, and the higher the valve is lifted off the cone-seating the greater will be the width of the orifices. Through these orifices a small quantity of the carbid will drop and falling on the surface of the cone $w$, which at that time will be in the position shown in dotted lines, will slide off into the water. Acetylene gas will be immediately generated, which by its pressure will cause the carbid-receptacle to rise and compress the springs $f\,f$. The rising of the receptacle $a$ will first cause the valve to close and shut off the supply of carbids, and afterward the valve itself will be raised with the receptacle and convey the cone $w$ into the interior of the cylinder $y$. The base of the cone fits the cylinder somewhat easily, thus permitting gas to pass from the water vessel into the gas-holder, but preventing the water from splashing into the upper portion of the generator. The gas generated will make room for itself, not only by lifting the carbid-receptacle, but also by swelling the envelop into a barrel shape when it is made of extensible material, such as rubber.

To prevent the occurrence of an accident from the generation of an undue quantity of gas, a safety-valve $z$ is provided, which opens inward and which is normally maintained in a closed position by means of a spring. In the most elevated position of the carbid-receptacle the stem of the valve comes in contact with the cross-bar $e$, causing the safety-valve to be opened. The valve which cuts off the carbid is not gas-tight, and the surplus gas finds a passage thereby to the safety-valve.

A screwed cap 1 is provided in the roof of the carbid-receptacle for the purpose of recharging it with carbid.

In order that the valve $t$ may be maintained in the closed position when recharging, a cam 2 is provided, which works on a pivot within a slit formed in the rod 3, which is secured to the roof of the carbid-receptacle. In the drawings the cam is shown in the inoperative position. When it is turned so that the handle lies on the right-hand side, the carbid-receptacle will be sustained in a partially-uplifted position, so that the rod $v$ is not able to reach the bottom of the water vessel $j$. The cam 2 may also be advantageously used to relieve the pressure of the gas when the generator-lamp is out of use.

In order to facilitate getting at the parts for inspection and recharging, the cover is united to the casing by a hinge 4 and a spring-catch 5. Also the casing is made in parts, united by bayonet-joints 6 6.

A fresh supply of water can be readily provided and the waste lime disposed of by unscrewing the water vessel at the neck $k$ and removing the downward-extending cylinder $y$.

When intended for a vehicle or other purpose, the outward form of the lamp is suitably modified; but the interior construction and method of operation remains virtually the same as has been shown and described.

Referring to the accompanying drawings, which show as a representative example a method of construction suitable for a table-lamp, Figure 1 is a sectional elevation, and Fig. 2 a plan, with the cover removed.

In the figures, $a$ is a carbid-receptacle, to which are secured two lugs $b$ $b$, the lower ends of which are threaded over guide-rods $c$ $c$, which at their lower ends are secured to the generator-case $d$ and at the upper ends are joined together by the cross-bar $e$, helical springs $f f$ being threaded on the guide-rod and interposed between the cross-bar and the lower ends of the lugs to press the receptacle $a$ downward. The gas-holding chamber surrounds the carbid-receptacle and is inclosed laterally by means of a flexible envelop $g$, which assumes approximately a cylindrical form and which is secured in gas-tight contact with the carbid-receptacle at the upper edge $h$ and with the casing of the generator at the lower edge $i$. A water vessel $j$ makes a gas-tight connection with the case $d$ by means of a screw and soft washer at the neck $k$. In this way the gas-holding chamber is entirely inclosed and expands and contracts in volume, partly by the rise and fall of the receptacle $a$ and partly by the swelling and contracting of the envelop $g$ when it is made of extensible material, such as rubber. Gas is conducted away from the gas-chamber to the burner $l$ through a mouthpiece $m$, a flexible tube $n$, a filtering and purifying chamber $o$, and a stop-cock $p$.

The bottom of the carbid-receptacle $a$ has the shape of an inverted cone with an orifice in the center. To it is screwed a valve-chamber $q$, the bottom of which is also an inverted cone with an orifice in the center. This orifice is normally kept closed by a valve, which consists of a cylinder $r$, which fits in and is guided by the tube $s$, which is secured to and depends from the roof of the carbid-receptacle, a cone-shaped collar $t$, the edge of which seats on the coned bottom of the chamber $q$, feathers $u$, formed by cutting away three or more portions of the guiding-cylinder below the collar $t$, and a rod $v$, to which is secured a cone $w$. Within the tube $s$ a helical spring $x$ is placed, which forces the valve into the closed position, as shown in the drawings. A short cylinder $y$, extending downward toward the water, is secured into the neck of the water vessel.

What I claim is—

1. An acetylene-gas generator consisting of a combination of a carbid-holder, a water vessel adapted to be removable from the rest of the apparatus and to make a gas-tight connection therewith, a chamber between the two, partially bounded by flexible material, such chamber being adapted to expand by the rising of the carbid-holder, exterior guides, exterior springs to press the carbid-holder downward and contract the chamber, a valve, a spring inclosed within a tube above the valve, and a rod secured to the valve of such length as to reach the bottom of the removable water vessel when the carbid-holder is near its lowest position, substantially as described.

2. An acetylene-gas generator consisting of a combination of a carbid-holder, a water vessel adapted to be removable from the rest of the apparatus and to make a gas-tight connection therewith, a chamber between the two, partially bounded by flexible material, such chamber being adapted to expand by the rising of the carbid-holder, exterior guides, exterior springs to press the carbid-holder downward and contract the chamber, a valve, a spring inclosed within a tube above the valve, a rod secured to the valve of such length as to reach the bottom of the removable water vessel when the carbid-holder is near its lowest position, a downward-extending cylinder removably secured to the mouth of the water vessel and a cone vertex upward secured to the valve-rod in such a position as to be clear of the cylinder when the rod touches the bottom of the water vessel and to be within the cylinder when uplifted, substantially as described.

3. An acetylene-gas generator consisting of a combination of a carbid-holder, a water vessel adapted to be removable from the rest of the apparatus and to make a gas-tight connection therewith, a chamber between the two, partially bounded by flexible material, such chamber being adapted to expand by the rising of the carbid-holder, exterior guides, exterior springs to press the carbid-holder downward and contract the chamber, a valve, a spring inclosed within a tube above the valve, a spring-closed safety-valve adapted to open inward when the carbid-holder reaches its upper limit and a cam adapted to relieve the pressure of the gas when the generator is out of use, substantially as described.

4. An acetylene-gas generator consisting of a combination of a carbid-holder, a water vessel adapted to be removable from the rest of the apparatus and to make a gas-tight connection therewith, a chamber between the two, partially bounded by flexible material, such chamber being adapted to expand by the rising of the carbid-holder, exterior guides, exterior springs to press the carbid-holder downward and contract the chamber, a valve, a spring inclosed within a tube above the valve, a rod secured to the valve of such length as to reach the bottom of the removable water vessel when the carbid-holder is near its lowest position, a downward-extending cylinder removably secured to the mouth of the water vessel and a cone vertex upward secured to the valve-rod in such a position as to be clear of the cylinder when the rod touches the bottom of the water vessel and to be within the cylinder when uplifted, a spring-closed safety-valve adapted to open inward when the carbid-holder reaches its upper limit and a cam adapted to relieve the pressure of the gas when the generator is out of use, a hinged cover, a filtering and purifying chamber on the hinged cover, and a flexible pipe connecting the gas-holder and the purifying-chamber, substantially as described.

In witness whereof I have hereunto set my hand in the presence of two witnesses.

HENRY BAUMGARTEN.

Witnesses:
GEO. J. B. FRANKLIN,
T. J. OSMAN.